(12) United States Patent
Biere et al.

(10) Patent No.: US 8,213,875 B1
(45) Date of Patent: Jul. 3, 2012

(54) LEARNING AND ADAPTIVE COMMUNICATION SERVICES

(75) Inventors: Devon L. Biere, Olathe, KS (US); Jeff Dillon, San Marcos, CA (US); Michael A. Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 521 days.

(21) Appl. No.: 12/485,055

(22) Filed: Jun. 16, 2009

(51) Int. Cl.
*H04B 17/00* (2006.01)

(52) U.S. Cl. .......... 455/67.7; 455/404.2; 455/422.1; 455/67.11; 455/572; 455/127.1; 715/705; 715/707; 715/708; 715/709; 715/716

(58) Field of Classification Search ............. 455/404.2, 455/422.1, 67.7, 67.11, 572, 127.1; 715/705, 715/707, 708, 709, 716
See application file for complete search history.

(56) References Cited

U.S. PATENT DOCUMENTS

| 2006/0053372 A1* | 3/2006 | Adkins et al. ............ 715/709 |
| 2006/0200432 A1* | 9/2006 | Flinn et al. .............. 706/12 |

* cited by examiner

*Primary Examiner* — Rafael Pérez-Gutiérrez
*Assistant Examiner* — Neda Behrooz

(57) ABSTRACT

A mobile communication device is provided. The mobile communication device comprises a touch screen adapted for receiving touch inputs and for presenting a visual display, a processor coupled to the touch screen, and an application. The application, when executed by the processor, analyzes a plurality of inputs to the mobile communication device to infer a behavior pattern and presents a sequence of teachings about how to use selected features of the mobile communication device on the touch screen, the selected features distinct from the inputs and selected based on the inferred behavior pattern.

16 Claims, 6 Drawing Sheets

LEARNING AND ADAPTIVE COMMUNICATION SERVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communications provide nearly ubiquitous communication connectivity in the United States. A large portion of the population of the United States possess a mobile communication device. In many cases, mobile communication devices may be purchased at a discounted price subsidized by wireless service providers. Many users may replace their mobile communication devices about every two years to upgrade to more fully functional and/or more aesthetically pleasing mobile communication devices. The technological sophistication of users of mobile communication devices ranges from those who merely want to use their mobile communication device to access plain old telephone service (POTS) to those who have high speed data service plans and use their mobile communication device to access the Internet.

SUMMARY

In an embodiment, a mobile communication device is disclosed. The mobile communication device comprises a touch screen adapted for receiving touch inputs and for presenting a visual display, a processor coupled to the touch screen, and an application. The application, when executed by the processor, analyzes a plurality of inputs to the mobile communication device to infer a behavior pattern and presents a sequence of teachings about how to use selected features of the mobile communication device on the touch screen, the selected features distinct from the inputs and selected based on the inferred behavior pattern.

In an embodiment, a processor based method of providing a user interface is disclosed. The method comprises storing a plurality of locations of a mobile communication device over at least thirty days and storing a plurality of activation events of input controls of the mobile communication device. The method further comprises analyzing the stored locations and the stored activation events of the mobile communication device to determine a category of user associated with the mobile communication device. The method further comprises, based on the category of user associated with the mobile communication device, presenting a sequence of teachings via the user interface, whereby a user of the mobile communication device is informed of previously unused capabilities of the mobile communication device.

In an embodiment, a processor based method of adapting a user interface is disclosed. The method comprises storing a plurality of locations of a mobile communication device and storing a plurality of control activations of a user interface of the mobile communication device. The method further comprises analyzing the stored locations and stored control activations of the mobile communication device to determine a category of user associated with the mobile communication device. The method further comprises, based on the category of user associated with the mobile communication device, adapting the user interface based on at least one of a current location of the mobile communication device and a current stored energy level of the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and method for a mobile communication device to learn and adapt to an individual usage pattern of a user. Additionally, the present disclosure teaches a system and method for a mobile communication device to provide teachings about the control functions and other functions of the mobile communication device to a user of the mobile communication device, the teachings adapted to the individual usage pattern and/or behavior pattern of the user. For example, a mobile phone embodiment of the present disclosure may comprise an application that tracks and records a plurality of interactions of the user including activation of input controls. The application may track and record power recharging cycles, tracking when the power is recharged with respect to the remaining power reserves and/or whether the mobile phone is often fully discharged to the point of automatically shutting off before the power is recharged. The application may track and record retrieval of voice messages left in an electronic voicemail box associated with the mobile phone. Based on an accumulated record of user behavior and control inputs, the application may adapt the interface of the mobile phone to provide an improved experience for the user. For example, the application may adapt the interface of the mobile phone to alert a low power reserve condition by flashing a message on a display of the mobile phone. The application may adapt the interface of the mobile phone to generate a text message notifying of a pending unheard voice message in the voicemail box of the mobile phone.

The same application, or a separate application, may provide teachings based on the record of user inputs and user behavior, for example based on having determined that the user does not use features of the mobile communication device. For example, the application may present a text message requesting the user to note the flashing light proximate to a volume control input based on the user having never or rarely actuated the volume control. The application may request the user to touch the remaining power reserve indication on a touch screen of the mobile communication device based on the user frequently omitting to recharge before the mobile communication device automatically shuts off due to low power reserve.

Figure 1:
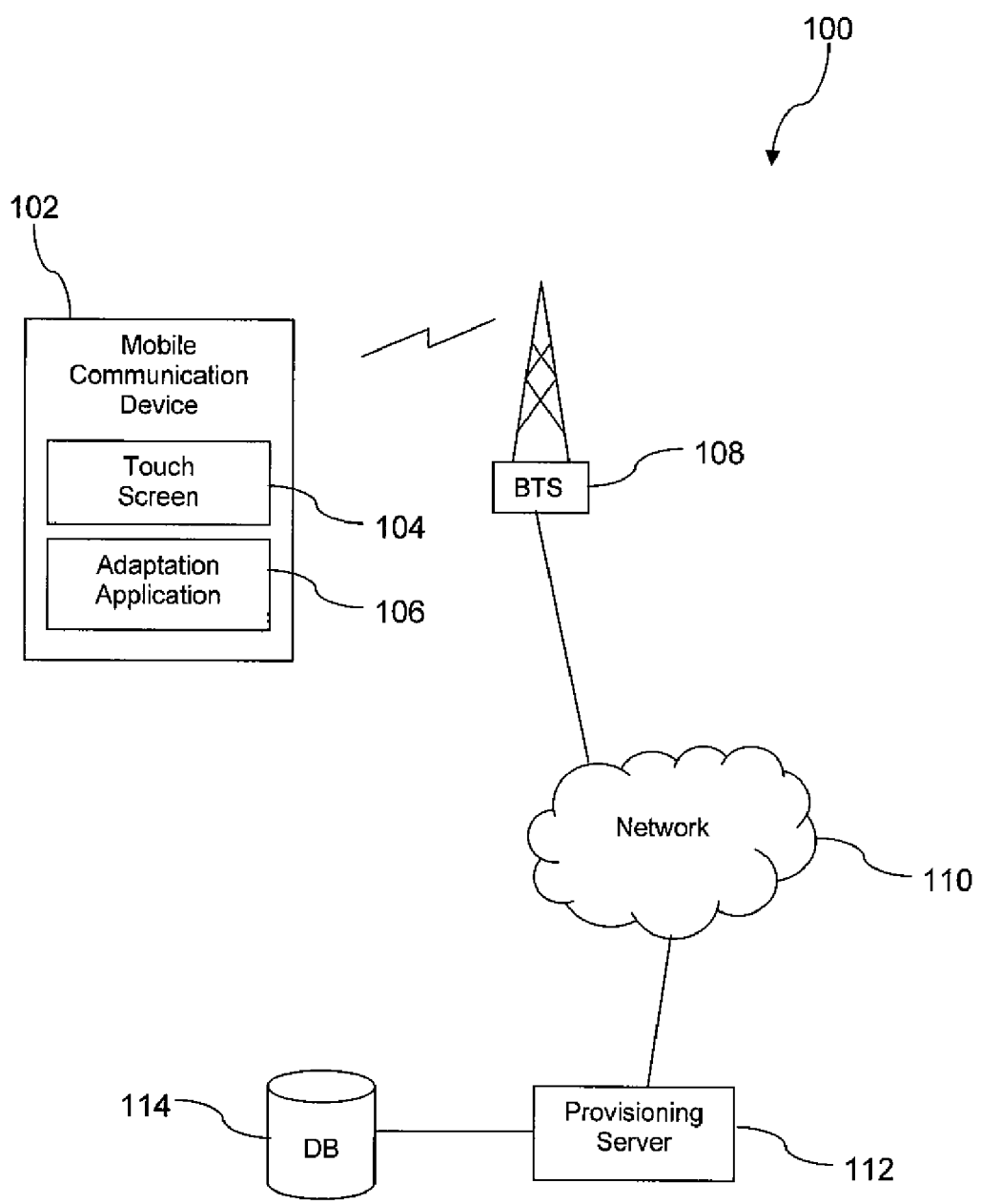
FIG. 1 is an illustration of a communication system according to an embodiment of the disclosure.

Turning now to FIG. 1, a system 100 is described. The system 100 comprises a mobile communication device 102 (hereinafter referred to as the mobile device 102), a base transceiver station 108, a network 110, a provisioning server 112, and a database 114. In an embodiment, the mobile device 102 may comprise a touch screen 104, but in other embodiments the mobile device 102 may comprise a display screen and keyboard and/or keypad input. In an embodiment, the mobile device 102 may comprise an adaptation application 106 that provides some of the functionality taught by the present disclosure. The mobile device 102 may be, for example and without limitation, a mobile phone, a personal digital assistant (PDA), a media player, and other portable electronic devices that are enabled to conduct wireless communication. An embodiment of a mobile phone and/or handset is described in detail hereinafter. In some contexts, the mobile device 102 may alternatively be referred to as a portable electronic device and/or a portable communication electronic device.

In an embodiment, the mobile device 102 communicates via a wireless link to the base transceiver station 108, via either a wired or wireless link from the base transceiver station 108 to the network 110, via the network 110 to a called terminal and/or content server (not shown). The wireless link between the mobile device 102 and the base transceiver station 108 may be provided using any of code division multiple access (CDMA), global system for mobile communication (GSM), long-term evolution (LTE), worldwide interoperability for microwave access (WiMAX), and other wireless communication technologies. The network 110 may comprise any combination of public and/or private networks and circuit switched and/or packet switched networks. While one mobile device 102 and one base transceiver station 108 are depicted in FIG. 1, it is understood that the system 100 may comprise any number of mobile devices 102 and base transceiver stations 108.

In an embodiment, the adaptation application 106 may monitor, track, and/or collect information about inputs to the mobile device 102 and/or information about user behavior. The adaptation application 106 may create a log of each input as an input control is actuated. The adaptation application 106 may create log entries periodically that identify a current location of the mobile device 102 and various state values of the mobile device 102, for example a current power reserve. Alternatively, the adaptation application 106 may employ some other approach to collecting information. For example, the adaptation application 106 may aggregate a count associated with each input control as the input control is actuated. The adaptation application 106 may periodically store the counts at a period that is effective to promote analysis of the collected information and to efficiently manage memory resources of the mobile device 102. In some contexts, the collection of input actuations and/or state values may be referred to as storing a plurality of locations of the mobile device 102 and/or storing a plurality of activation events of input controls of the mobile device 102. In some contexts, the mobile device 102 may be referred to as a portable electronic device.

In an embodiment, the adaptation application may analyze the collected information to identify a use pattern of the mobile device 102 and/or to identify a category of user associated with the mobile device 102. In some contexts, the use pattern may be referred to as a behavior pattern. In an embodiment, the adaptation application 106 may identify a user as one of an attentive user and an inattentive user. An inattentive user, for example, may rarely actuate the volume controls to adjust the audio volume to environmental conditions such as loud road rumble or loudspeaker announcements at an airport terminal. Other information may be associated with an inattentive user, for example above average frequency of exhausting the power reserve to the automated power off level, failure to return missed calls promptly, and failure to playback voicemail messages promptly. An inattentive user may be identified based on not initializing one or more features of the mobile device 102 and/or features of a wireless service associated with the mobile device 102, for example not initializing a voicemail message box.

Other categories of user may be identified as needed and/or useful. A wide range of user behavior may be employed to categorize user behavior including, but not limited to, use of an address book, use of a scheduling application, use of an alarm function, use of alternative operating modes such as silent mode, use of text messaging, use of a browser, use of an email application, use of a camera, use of a projector, configuring a voicemail message, configuring distinctive ring tones for different entries in the address book, configuring special backgrounds for the display, and other user behavior.

The adaptation application 106 may adapt the interfaces of the mobile device 102 and/or adapt the functionality of the mobile device 102 based on the user category and/or based on behavior patterns. For example, the adaptation application 106 may determine from analysis that the user of the mobile device 102 typically observes a regular work schedule and may adapt the functionality of the mobile device 102 accordingly. For example, the mobile device 102 may bring controls for invoking business applications to a more conveniently accessible location on a display of the mobile device 102 during the working day and bring controls for invoking leisure applications to the front during non-working hours. The mobile device 102 may associate phone calls handled by the mobile device 102 with client calls and may bring a scheduling control to a prominent position on the display, based on the observance that the user of the mobile device 102 frequently enters an appointment in the scheduling tool subsequent to a call to and/or from the phone number. The mobile device 102 may adapt to present a text message to notify the user of a waiting voicemail message, based on analysis that the user neglects to timely retrieve voicemail messages. Alternatively, if the adaptation application 106 has identified a pattern of frequent usage of the calendar tool, the adaptation application 106 may schedule a calendar event for checking voicemail. In many mobile devices 102, the calendar application (not shown) may provide an on screen reminder of calendar events, and hence the check voicemail calendar event may be presented as an onscreen reminder.

In an embodiment, the adaptation application 106 may adapt the user interface of the mobile device 102 based on a behavior pattern and/or a user category in a way that is seemingly unrelated to the information on which the determination of the behavior pattern and/or user category are based. For example, the adaptation application 106 may infer that the user is an inattentive user because the power reserve of the mobile device 102 is frequently fully depleted to the automated power off level before recharging; and the adaptation application 106 may adapt the mobile device 102 to present a text message when a new voice message is posted to the voicemail box based on the categorization of the user as an inattentive user, on the inference that an inattentive user may not promptly retrieve the new voice message.

In an embodiment, the adaptation application 106 may provide brief instructional tutorials at selected times and/or triggered by selected use scenarios. In another embodiment, a separate application, in communication with the adaptation application 106 at least to receive the designation of user category and/or to receive the determined behavior patterns from the adaptation application 106, may provide teachings about using the mobile device 102. If a user has never actuated the volume control of the mobile device 102, the adaptation application 106 may cause a light to illuminate flashingly proximate to and/or under the volume control and display a message stating that the indicated control may be used to control the ear speaker louder or quieter, for example on the triggering event of the mobile device 102 being plugged into a charger. If a user frequently discharges the mobile device 102 to an automated power off level, the adaptation application 106 may display a message describing the function of the power reserve indicator and then display a message requesting the user to touch the displayed power reserve indicator to confirm they have understood the message and have indeed located the indication.

In an embodiment, the adaptation application 106 may be said to tailor the user interface and/or the application behavior of the mobile device 102 to the user over time, as the adaptation application 106 "learns the user." For example, the adaption application 106 may learn, over time, that the user of the mobile device 102 does not like receiving aural and/or audio alerts of any kind, including telephone call ringing. The adaptation application 106 may infer this based on settings the user configures for the mobile device 102. In response, the adaptation application 106 may choose to use other means of alerting conditions of the mobile device 102. In an embodiment, the adaptation application 106 may transmit the information it has stored about input actuation events, about user behavior, and about location of the mobile device 102 to the provisioning server 112 for storage in the database 114. In an embodiment, some of the analysis of the behavioral information may be analyzed by the provisioning server 112 analyzing the information stored in the database 114. In an embodiment, the provisioning server 112 may analyze the behavioral information associated with the mobile device 102 and compare this information against norms for similar behavioral information collected from a plurality of mobile devices 102. In an embodiment, the provisioning server 112 may determine the category of user and transmit this to the mobile device 102 for use by the adaptation application 106 to adapt the user interfaces of the mobile device 102. In an embodiment, the provisioning server 112 may be implemented as a computer and/or computer system. Computers are described further hereinafter.

In an embodiment, the provisioning server 112 may promote transferring at least some of the behavioral information collected for a subscriber to a wireless communication service to a newly activated mobile device 102 associated with the subscriber, for example when replacing an old mobile phone with a new mobile phone. This functionality may promote maintaining a consistent usage experience for the subscriber and/or user of the mobile device 102. This functionality may spare the user the inconvenience of an initial period of inconvenience as the new mobile device 102 "learns the user." This functionality may remove an obstacle to new device purchases.

Figure 2:
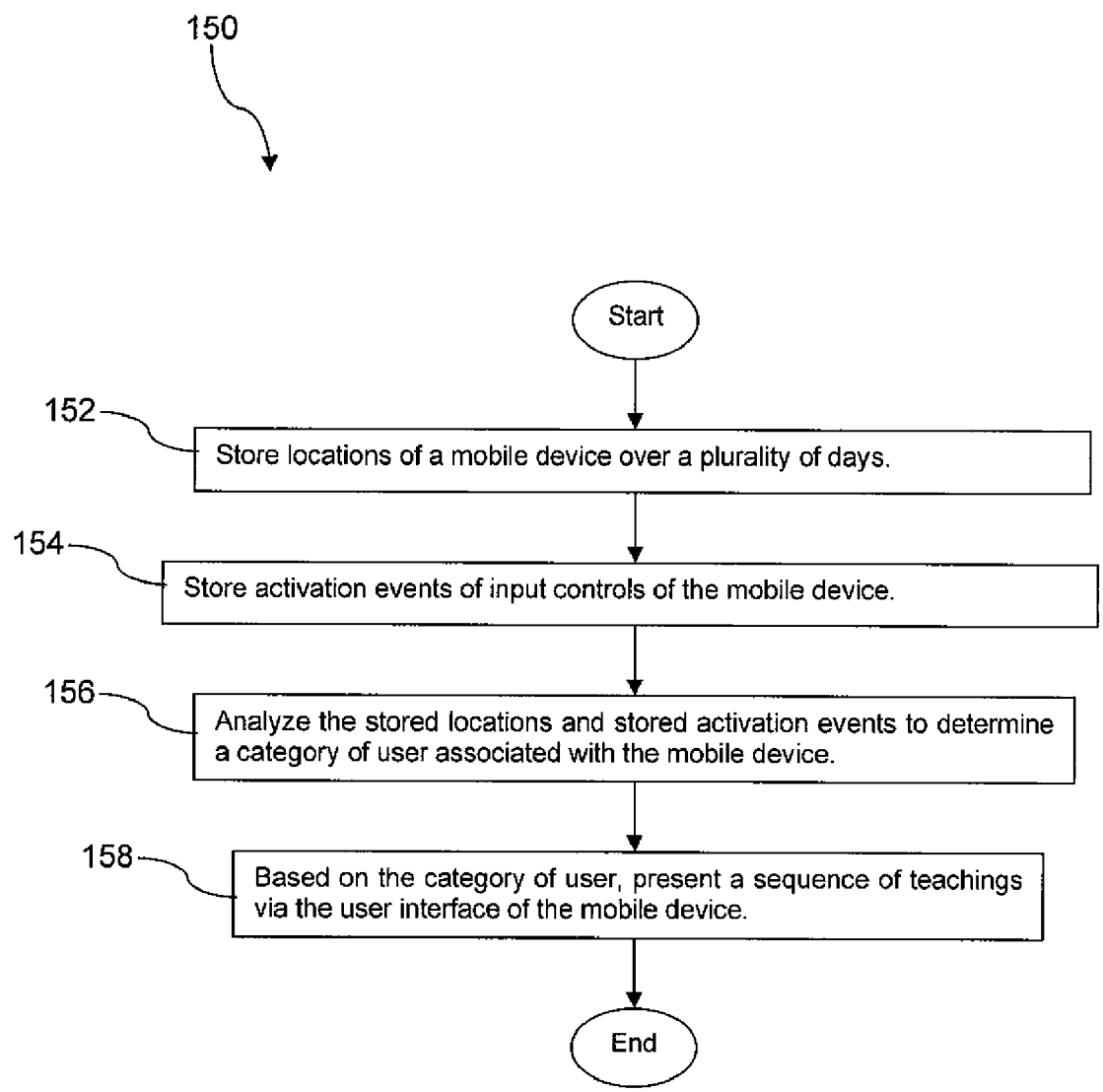
FIG. 2 is a flow chart of a method according to an embodiment of the disclosure.

Turning now to FIG. 2, a method 150 is described. At block 152, locations of the mobile device 102 are stored over a plurality of days. The locations may be determined and stored on a periodic basis, for example every 5 minutes, every 10 minutes, every 15 minutes, every hour, or some other effective periodic basis. Alternatively, the location of the mobile device 102 may be determined occasionally and only stored when a change of location has been observed.

At block 154, input control activation events of the mobile device 102 are stored over a plurality of days. It is understood that the processing of blocks 152 and 154 may overlap in time. The input control activation events may be activations and/or actuations of the volume control, activation of soft keys associated with situation specific functions such as a camera phone, and other activation events. The processing of block 154 may further comprise storing other information such as plugging the mobile device 102 into a charger. The processing of block 154 may further comprise periodically and/or occasionally storing other information about the state of the mobile device 102, for example a current power reserve level, a number of pending voice messages, and other conditions and/or states.

At block 156, the stored locations, stored input control activation events, stored state information, and other stored information are analyzed to determine a category of user associated with the mobile device 102. The analysis may be performed on the mobile device 102 and/or on a server computer, for example the provisioning server 112 or another server (not shown). Additionally, the stored locations, stored input control activation events, stored state information, and other stored information may be analyzed to determine, generally, one or more behavior patterns. The stored information may be used to infer a work schedule of the user of the mobile device 102.

At block 158, teachings are presented by the mobile device 102, for example via a user interface of the mobile device 102. The teachings may be presented on the touch screen 104 of the mobile device 102. The teachings may be presented on a display of the mobile device 102. Some of the teachings may be provided, in part, by other output devices of the mobile device 102, for example lights or light emitting diodes positioned around the mobile device 102 and/or by audio emitters such as speakers and/or by vibrators. The teachings may be presented based on the category of user determined in block 156. The teachings may be presented based on the one or more behavior patterns determined in block 156. For example, based on analyzing the control activation events to determine that the user has not configured a voice message reply, a teaching may be provided for setting up a voice message reply. It is understood that, in an embodiment, the processing of blocks 152, 154, 156, and 158 may be repeated over time, for example in an iterative pattern.

Figure 3:
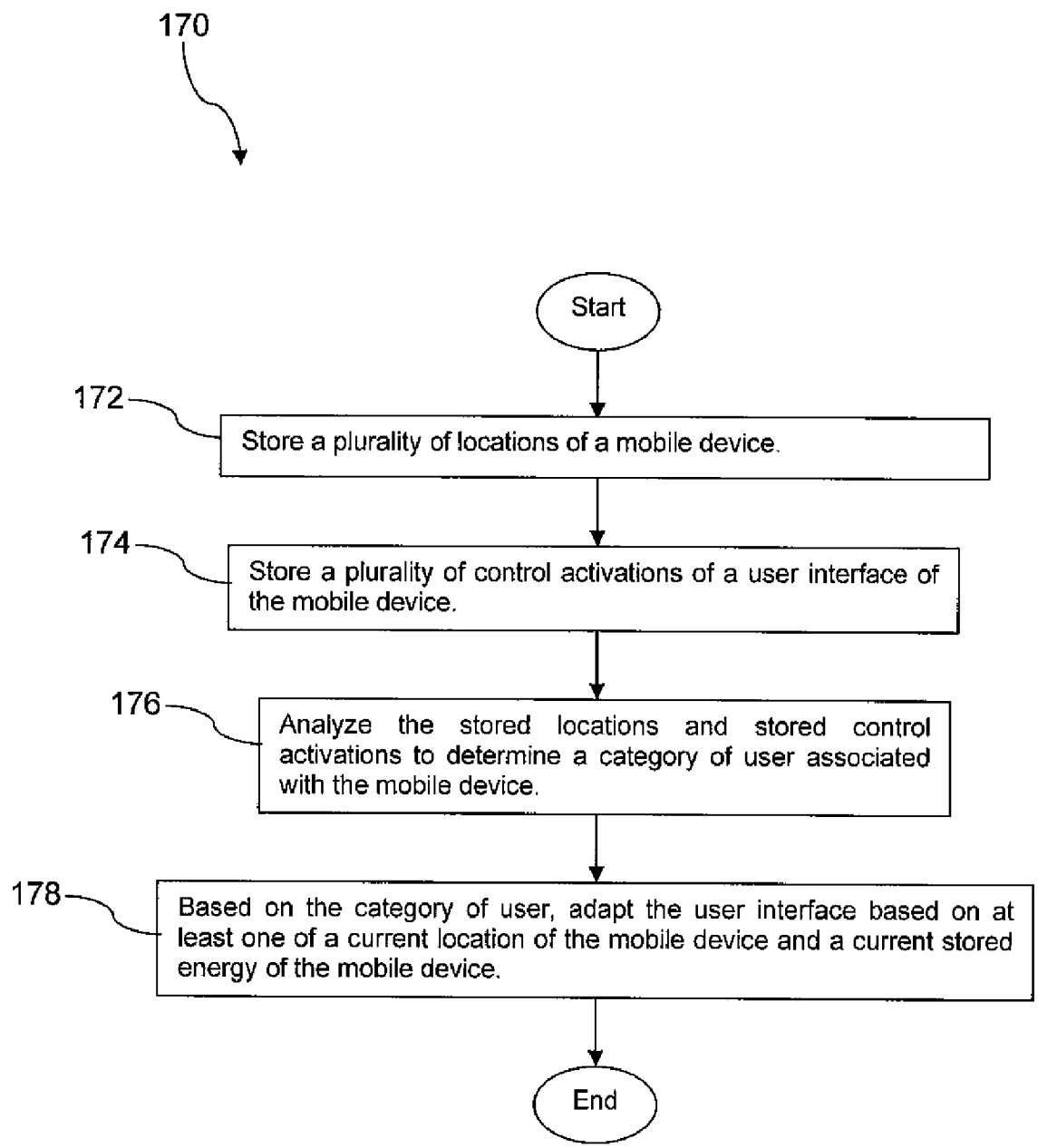
FIG. 3 is a flow chart of another method according to an embodiment of the disclosure.

Turning now to FIG. 3, a method 170 is described. Blocks 172, 174, and 176 correspond substantially with blocks 152, 154, and 156, respectively, as described above with reference to FIG. 2. At block 178, the user interface of the mobile device 102 is adapted based on the category of user determined in block 176 and/or based on one or more behavior patterns determined in block 176. The user interface may be adapted, for example, by presenting a text message alerting the user to a pending voice message. The user interface may be adapted, for example, by adding a calendar event associated with listening to a pending voice message and providing an onscreen reminder of the calendar event on a display of the mobile device 102. The user interface may be adapted, for example, by presenting a flashing text display of low battery and/or an aural alert of low battery when the reserve power level drops low and when a behavior pattern is determined of frequently failing to recharge the battery of the mobile device 102 before the device executes an automatic low power shutdown. In some cases, the adaptation of the user interface may seem unrelated to the stored information on which the adaptation is based, for example when a user not using a volume control and/or not retrieving voice messages promptly leads to a determination of an inattentive user, and the determination of an inattentive user is the basis of an adaptation to present a flashing visual display to alert the user to a low power reserve condition on the theory that an inattentive user may not otherwise notice the low power reserve condition based on the standard power reserve indication and may allow the mobile device 102 to discharge to the automated power off level.

Figure 4:
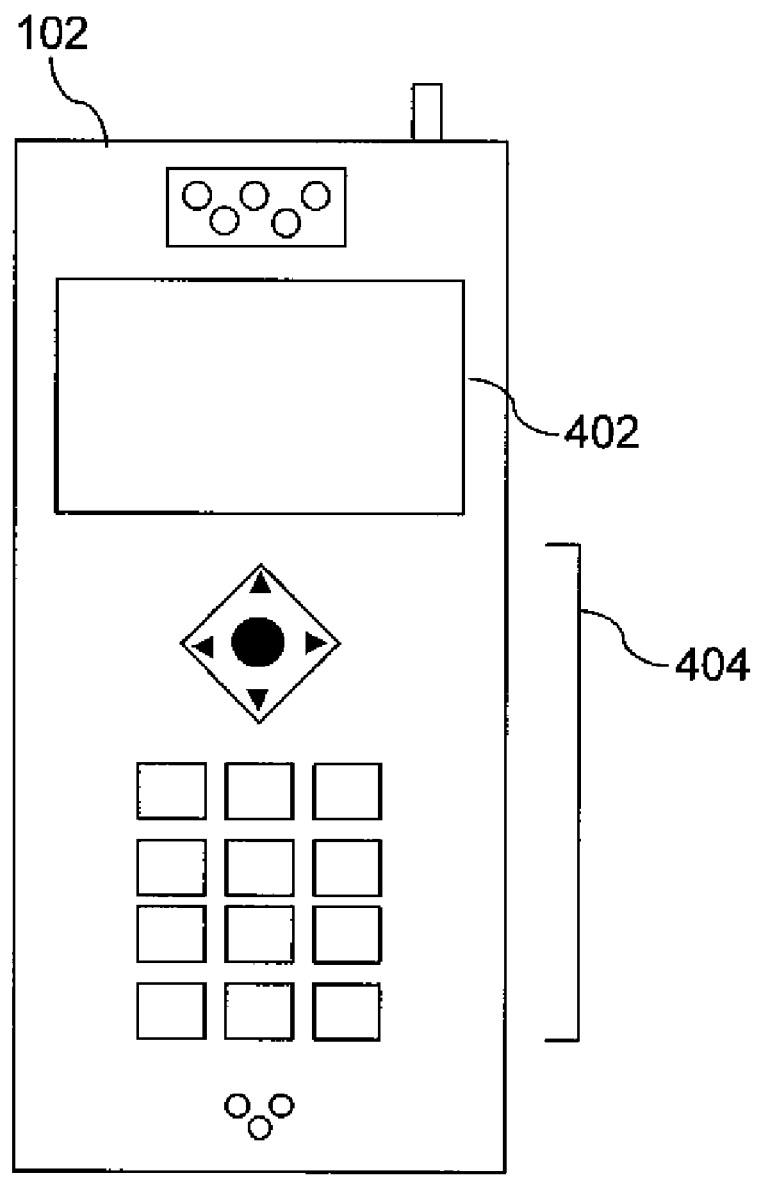
FIG. 4 is an illustration of a handset according to an embodiment of the disclosure.

FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

Figure 5:
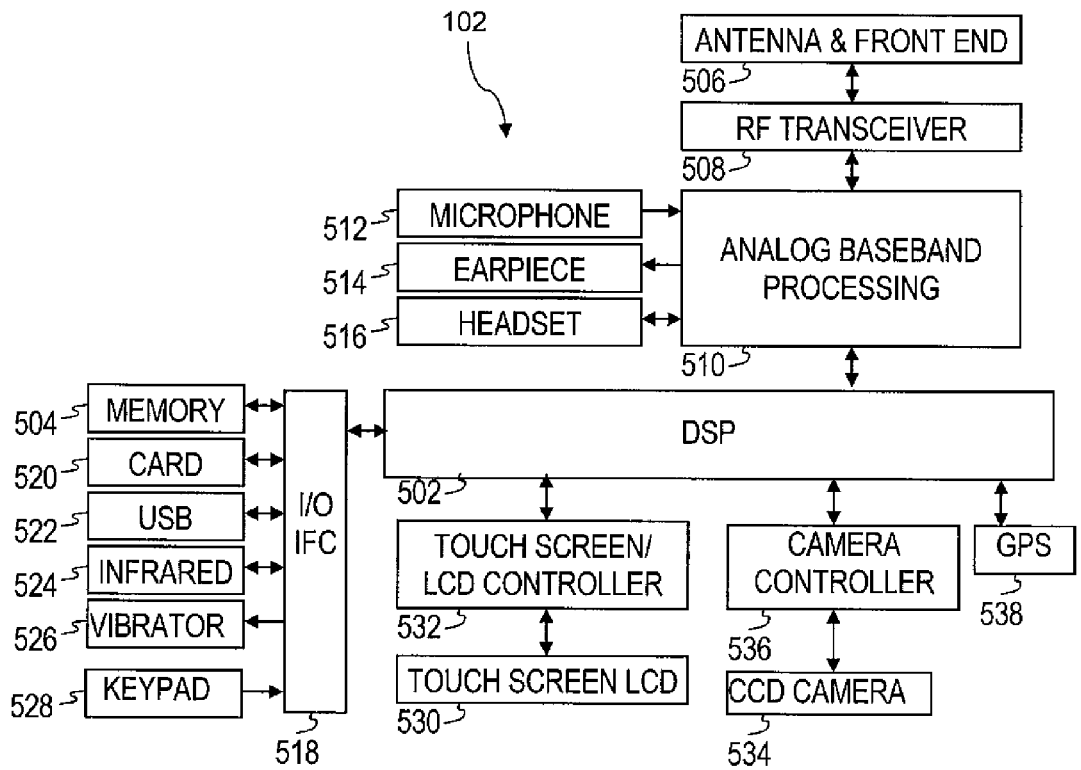
FIG. 5 is a block diagram of a handset according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
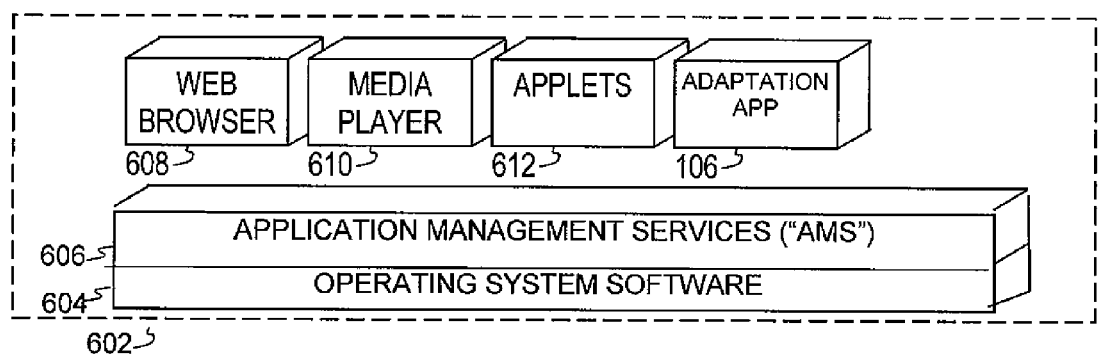
FIG. 6 is a block diagram of a software architecture for a handset according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The adaptation application 106 pictured in FIG. 6 has been discussed above with reference to FIG. 1.

Figure 7:
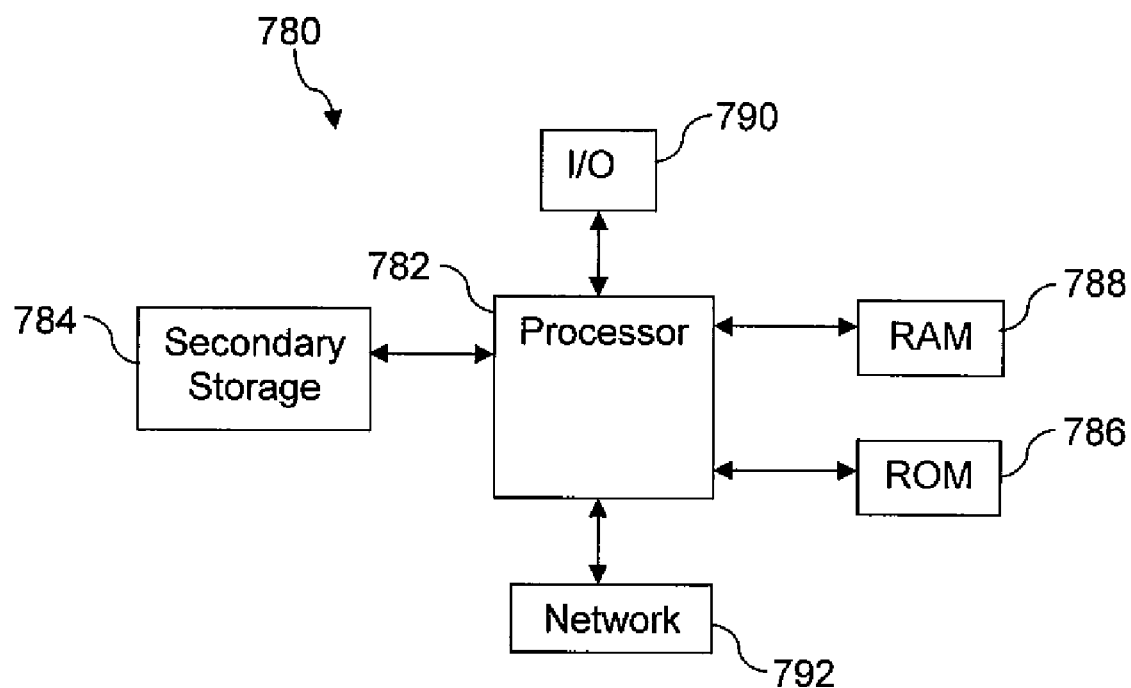
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX) and other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
   a touch screen adapted for receiving touch inputs and for presenting a visual display;
   a processor coupled to the touch screen; and
   an application that, when executed by the processor,
      analyzes a plurality of inputs to the mobile communication device to infer a behavior pattern and
      presents a sequence of teachings about how to use selected features of the mobile communication device on the touch screen, the selected features distinct from the inputs and selected based on
      the inferred behavior pattern,
      wherein the application activates a flashing light proximate to a volume control and presents a textual message instructing a user to activate the volume control to acknowledge understanding of the function of the volume control, and
      wherein the application selects the volume control for presenting a teaching based on inferring an unobservant user behavior pattern from a plurality of reserve power exhaustion events.

2. The mobile communication device of claim 1, wherein the application presents an image of a remaining power reserve and presents a textual message instructing a user to touch the image of the remaining power reserve to acknowledge understanding of the meaning of the image of the remaining power reserve.

3. The mobile communication device of claim 1, further comprising a speaker to provide audio alerting capability and further including the application adapting a user interface presented by at least one of the touch screen and the speaker based on the behavior pattern.

4. The mobile communication device of claim 3, wherein adapting the user interface is further based on a current location of the mobile communication device.

5. The mobile communication device of claim 1, further comprising a radio transceiver adapted for communicating according to at least one of a code division multiple access (CDMA), a global system for mobile communications (GSM), long-term evolution (LTE), and a worldwide interoperability for microwave access (WiMAX) wireless communication technology.

6. A processor based method of providing a user interface, comprising:
   storing a plurality of locations of a mobile communication device over at least thirty days;
   storing a plurality of activation events of input controls of the mobile communication device;

analyzing the stored locations and the stored activation events of the mobile communication device to determine a category of user associated with the mobile communication device; and based on the category of user associated with the mobile communication device, presenting a sequence of teachings via the user interface, whereby a user of the mobile communication device is informed of previously unused capabilities of the mobile communication device, wherein the category of user is one of an observant user and an unobservant user, and wherein the mobile communication device is associated with the unobservant user category based on at least one of adjusting a volume of the mobile communication device less than once in a month and depleting a reserve power of the mobile communication device to an automatic power-down more than twice in a month.

7. The method of claim 6, wherein the teaching is directed to a volume control of the mobile communication device.

8. The method of claim 6, wherein the teaching is directed to a display of indications of the state of the mobile communication device.

9. The method of claim 8, wherein the indications of state comprise at least one of a remaining power level, a radio signal strength level, a voice message in an in-box, a received electronic message, and a communication service type availability.

10. The method of claim 9, wherein the teaching comprises presenting a text message directing attention to one of the indications of state and requesting an acknowledgement of the teaching by touching the displayed indication of state.

11. The method of claim 6, wherein the mobile communication device is one of a mobile phone, a personal digital assistant (PDA), and a media player.

12. A processor based method of adapting a user interface, comprising:

storing a plurality of locations of a mobile communication device;

storing a plurality of control activations of a user interface of the mobile communication device;

analyzing the stored locations and stored control activations of the mobile communication device to determine a category of user associated with the mobile communication device; and based on the category of user associated with the mobile communication device, adapting the user interface based on at least one of a current location of the mobile communication device and a current stored energy level of the mobile communication device, wherein the category of user is one of an observant user and an unobservant user, and wherein the mobile communication device is associated with the unobservant user category based on at least one of adjusting a volume of the mobile communication device less than once in a month and depleting a reserve power of the mobile communication device to an automatic power-down more than twice in a month.

13. The method of claim 12, wherein adapting the user interface comprises automatically reducing an alerting volume of the mobile communication device based on a current location of the mobile communication device in a home metropolitan area associated with the mobile communication device based on the stored locations of the mobile communication device.

14. The method of claim 12, wherein the storing of locations of the mobile communication device, the storing of control activations of the mobile communication device, and the analyzing the stored locations and control activations is performed by a server computer communicatively coupled to the mobile communication device.

15. The method of claim 12, wherein the mobile communication device is one of a mobile phone, a personal digital assistant (PDA), and a media player.

16. The method of claim 12, further comprising adapting a user interface of a replacement mobile communication device based on the category of user associated with the mobile communication device.

* * * * *